G. VALIQUETTE.
TIRE PROTECTOR.
APPLICATION FILED NOV. 30, 1921.
1,425,299.
Patented Aug. 8, 1922.
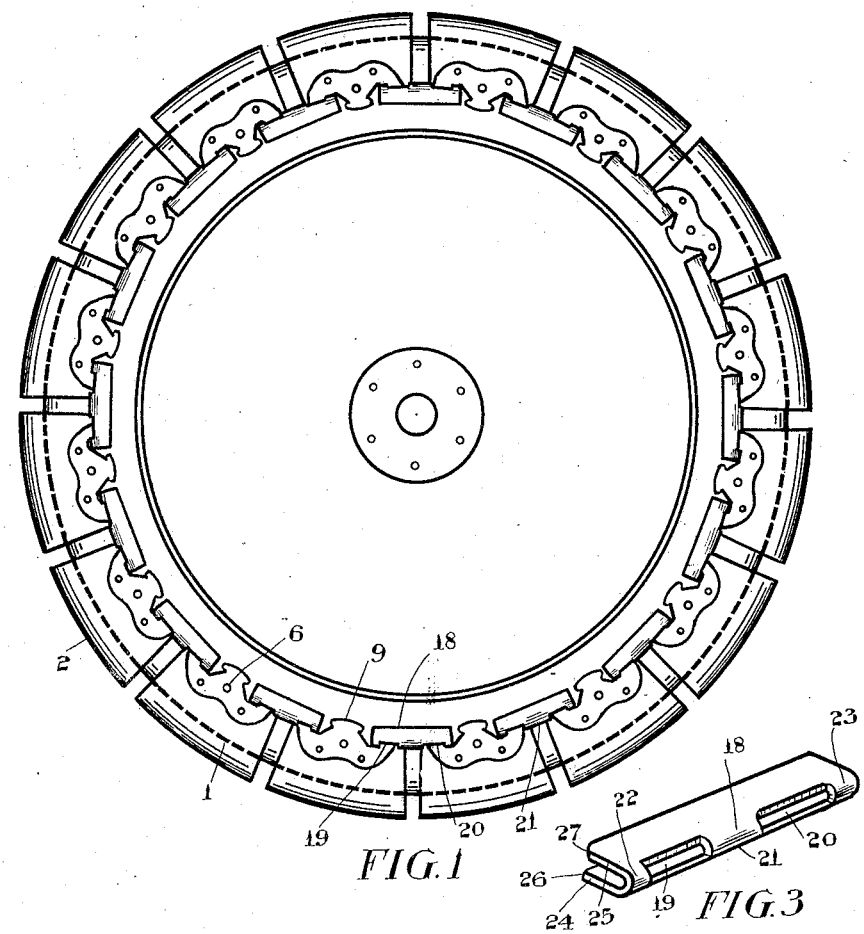
FIG.1
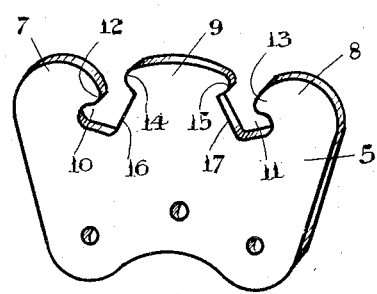
FIG.3
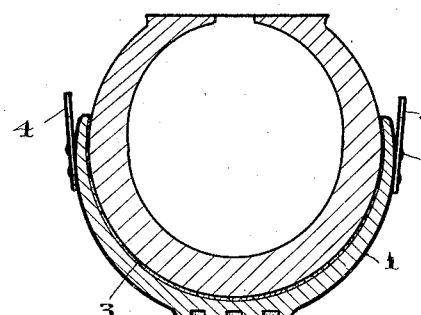
FIG.4
FIG.2
INVENTOR
G. Valiquette
BY C.J. Fetherstonhaugh
ATTORNEY

UNITED STATES PATENT OFFICE.

GILLES VALIQUETTE, OF MONTREAL, QUEBEC, CANADA.

TIRE PROTECTOR.

1,425,299.  Specification of Letters Patent.  Patented Aug. 8, 1922.

Application filed November 30, 1921. Serial No. 518,775.

*To all whom it may concern:*

Be it known that I, GILLES VALIQUETTE, a subject of the King of Great Britain, and residing at the city of Montreal, in the Province of Quebec, in the Dominion of Canada, have invented a new and useful Tire Protector, of which the following is the specification.

The invention relates to a tire protector as described in the present specification and illustrated in the accompanying drawings that form part of the same.

The invention consists essentially of the novel features of construction pointed out broadly and specifically in the claim for novelty following a description in detail of the preferred form of the invention.

The objects of the invention are to insure a better grip of the pavement and avoid skidding and at the same time minimize the dangers and inconvenience due to the bursting and puncturing of the tires; to reduce the cost of maintenance in automobiles and other vehicles of the same description; to eliminate the use of chains in bad weather and over snow roads; and generally to provide a cheap and effective means of saving the tires from the destructive road contact.

In the drawings, Figure 1 is a side elevation of the vehicle wheel showing the protector secured on the wheel tire.

Figure 2 is a perspective detail of the latch plate.

Figure 3 is a perspective detail of a latch bar.

Figure 4 is a cross sectional view of a latch plate as applied to the tire.

Like numerals of reference indicate corresponding parts in the various figures.

Referring to the drawings, the protector members 1 are made of rubber and have the thickened central tread portion 2 and seven vacuum holes in grouped arrangement in said tread portion.

The canvas lining 3 covers the inner surface of the protector which in shape is part circular.

The latch plates 4 and 5 are secured by the rivets 6 to the protector 1, one at each end and each plate is made with the end lugs 7 and 8 and the middle lug 9 formed by the latch bar slots 10 and 11.

The lugs 7 and 8 are each formed with the inwardly projecting bill ends 12 and 13 to hook the latch bars and the middle lug 9 is formed with the outwardly projecting ears 14 and 15, which are in diagonal alignment with the tips of the bill ends 12 and 13, the inner walls 16 and 17 of the slots 10 and 11 slanting in a similar diagonal direction to direct the bars against the ears 14 and 15.

The latch bars 18 are formed of a U-shaped bar in cross section with the back cut out to form the hook slots 19 and 20, these slots being spaced by the middle length of back 21, which is approximately twice as long as the end lengths of back 22 and 23.

The sides 24 and 25 are curved at the ends 26 and 27 to facilitate the interlocking of the bars with the plates.

In the use of this invention the protectors are mounted on the tire casing and strung together by means of the latch bars 18 which snap into the latch plate slots and hold one plate to the other at both ends of the protector, the tire being inflated subsequent to installation to insure better locking.

What I claim is:

In a tire protector, a fastening for a plurality of tread pieces comprising plates and links, each of said plates having a middle lug with minor guard lugs therefrom and corner lugs inwardly turned at the ends and forming with the said middle lug link recesses, and links each formed of a bent plate having a curved back slotted towards the ends to receive a corner lug in each recess.

Signed at Montreal, Canada, this 23rd day of November, 1921.

GILLES VALIQUETTE.